(12) United States Patent
Nakazawa et al.

(10) Patent No.: US 6,428,125 B1
(45) Date of Patent: Aug. 6, 2002

(54) DECK APPARATUS EQUIPPED WITH A LOCK MECHANISM

(75) Inventors: Hiroshi Nakazawa; Takahisa Miyamoto, both of Inagi; Hiroyuki Sugihara; Kenichi Utsumi, both of Kawasaki, all of (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/535,588

(22) Filed: Mar. 27, 2000

(30) Foreign Application Priority Data

Aug. 4, 1999 (JP) .......................................... 11-221340

(51) Int. Cl.[7] .............................................. E05B 65/46
(52) U.S. Cl. ...................................................... 312/216
(58) Field of Search ................................. 312/215, 216, 312/218, 222, 107.5, 221, 217

(56) References Cited

U.S. PATENT DOCUMENTS 788,966 A * 5/1905 Upton ..................... 312/107.5
5,074,627 A * 12/1991 Broeders ................. 312/218 X
6,109,708 A * 8/2000 Walla et al. .................. 312/216

* cited by examiner

Primary Examiner—James O. Hansen
(74) Attorney, Agent, or Firm—Greer, Burns & Crain, Ltd.

(57) ABSTRACT

In order to prevent a deck tower from collapsing because two or more decks are drawn at the same surface side of the deck tower, stopper mechanisms for preventing the deck from being drawn are provided at deck shelves at the upper and lower tiers. A deck apparatus includes a stopper member for preventing the decks from being drawn, which is movably mounted, so that the stopper mechanisms at the upper and lower tiers may be linked with each other. It also includes a locking arm for when the stopper member at any shelf is moved to release the deck from being locked, preventing the stopper members at the remaining shelves from moving. The locking arm allows only an deck to be alternatively drawn.

4 Claims, 8 Drawing Sheets

(a)　　　　(b)　　　　(c)

DECK APPARATUS EQUIPPED WITH A LOCK MECHANISM

BACKGROUND OF THE INVENTION

1. Field of the Invention

The present invention relates to a technique effectively applied to a deck locking mechanism capable of accommodating decks in tiers.

2. Description of the Related Art

In a deck tower accommodating magnetic tape drive units etc. in tiers known is a mechanism formed of a rigid metal frame assembled into shelves in tiers, including a wheel mounted to the bottom thereof for the easy movement, a deck tray at each shelf so as to be drawn toward the back of the deck tower, and a deck (drive unit) fixed onto the deck tray. In other words, for a maintenance on the decks mounted in the deck tower, the deck trays must be drawn to the back of the deck tower.

When heavy decks such as magnetic tape drive unit are employed, if two or more deck trays are drawn from the same deck tower, the center of gravity of the deck tower will fall outside on the back side, causing a risk of collapsing the deck tower itself, potentially leading to serious accidents.

In order to avoid this, the deck tower may be fixed to the floor; however, it would be inconveniently difficult to move the deck tower.

Therefore, the only option to prevent the deck tower from collapsing with a movable deck tower structure is that a maintenance operator's care must be thoroughly taken not to draw two or more deck trays from the same deck tower at the same time.

The present invention has been made in view of the above-stated problems, and its technical object is to structurally prevent an operator from recklessly drawing a plurality of deck trays.

SUMMARY OF THE INVENTION

In order to solve the foregoing problems, the present invention adopts the following procedure.

A deck shelf at an upper tier and a deck shelf at a lower tier respectively include stopper mechanisms for preventing decks from being drawn so that these stopper mechanisms at the upper and lower shelves may be linked with each other. The "link" as used herein means a mechanism such that one operation is permitted while the other operation is prevented, or it means that one operation and the other operation are cooperated with each other.

More specifically, the present invention provide a deck apparatus in a deck tower having deck shelves in tiers, the deck tower from which decks accommodated in the deck shelves are drawable, the deck apparatus comprising: a stopper member movably provided at each deck shelf for preventing the decks from being drawn; and a locking arm for, when the stopper member at any shelf is moved to release the prevention of drawing the decks, preventing the stopper members at the remaining shelves from moving. The locking arm only permits a deck to be alternatively drawn to prevent the deck tower from collapsing.

Instead of the locking arm, cams, which operated with the sliding movement of the stopper members to rotate, may be provided, and a link arm may be provided between the cams at the upper and lower deck shelves. These cams are interlocked with each other so that when the link arm urges either stopper member at the upper or lower tier to move in the direction permitting the deck to be drawn, the other stopper member may be positioned to prevent the decks from being drawn. This may only permit a deck to be alternatively drawn to prevent the deck tower from collapsing.

DETAILED DESCRIPTION OF THE PREFERRED EMBODIMENTS

The preferred embodiments of the present intention will now be described with reference to the accompanying drawings.

First Embodiment

Figure 1:
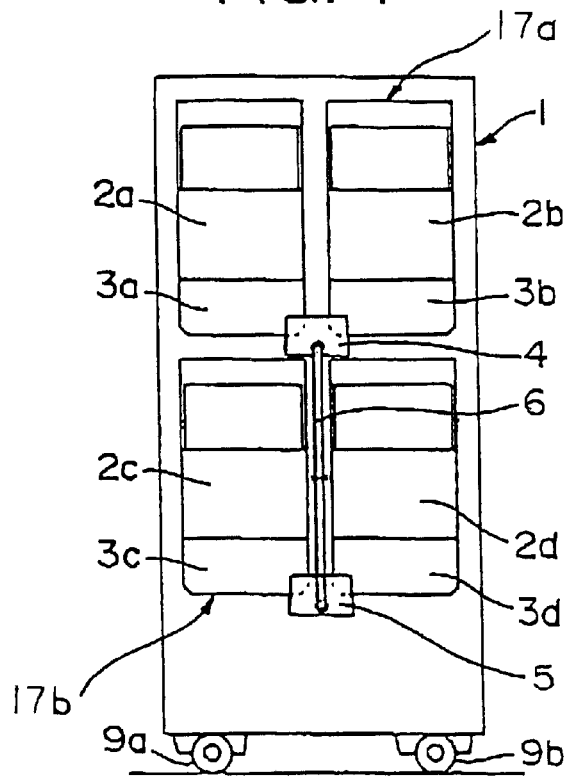
FIG. 1 is a front view showing a deck tower in accordance with an embodiment of the present invention.
Figure 2:
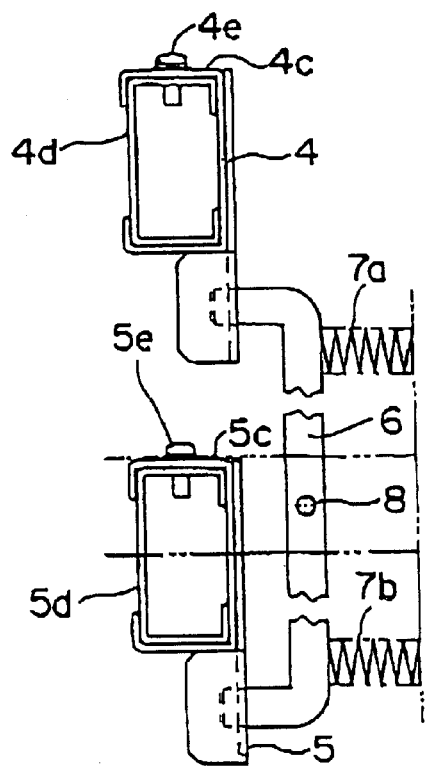
FIG. 2 is a side view showing a link mechanism between stopper members and a locking arm in accordance with a first embodiment of the present invention.
Figure 3:
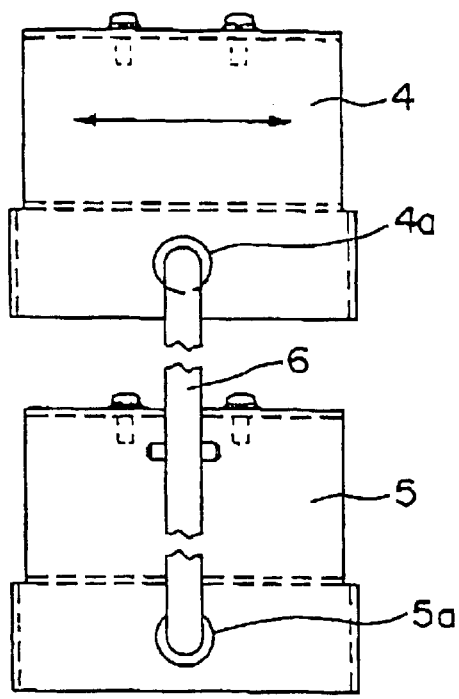
FIG. 3 is an explanatory diagram showing a positional relation of the stopper members in accordance with the first embodiment of the present invention.

FIG. 1 is a front view showing a deck tower in accordance with a first embodiment of the present invention.

A deck tower 1 has an elongated rectangle-like casing configuration, including casters 9a and 9b attached to the bottom thereof to be movable on the floor.

The deck tower 1 includes deck shelves 17a and 17b at the upper and lower tiers, and decks 2a, 2b, 2c, and 2d respectively fixed to deck trays 3a, 3b, 3c, and 3d are received at the respective shelves. The deck trays 3a, 3b, 3c, and 3d can be drawn forward as viewed in FIG. 1.

In this figure, a stopper member 4 is disposed at the front lower portion between the deck trays 3a and 3b at the upper shelf so as to be horizontally slidable. The stopper member 4 is formed of a pair of bent stainless alloy plates, and made by combining plate members 4c and 4d each of which is machined into a rectangular configuration with one side opened, which is then fixed by a screw 4e.

The stopper member 4 is suspended by a horizontal rail (not shown) so as to be horizontally movable, and stopped in position middle of the left deck tray 3a at the upper tier and the right deck tray 3b at the upper tier in a normal state (i.e., while no maintenance is performed). The stopper member 4 is stopped at this middle position, so that it can function as a stopper to prevent either the left or right deck tray 3a or 3b from being drawn. A stopper hole 4a is formed at the center in the proximal front surface of the stopper member 4. The function of the stopper hole 4a will be described later.

An identical stopper member 5 is disposed at the front lower portion between the deck trays 3c and 3d at the lower tier shelf. The stopper member 5 is also made by combining plate members 5c and 5d, which is then fixed by a screw 5e so as to be movable in the horizontal direction. A stopper hole 5a is also formed at the center in the proximal front surface of the stopper member 5.

A locking arm 6 is mounted between the upper stopper member 4 and the lower stopper member 5. The locking arm 6 can be rocked about a pivot portion 8 so as to approach the deck tower 1 and to be apart therefrom, and the neutral position is regulated by means of springs 7a and 7b in the vicinity of the both ends, which are biased from the direction opposite to the deck tower. The pivot portion 8 and the springs 7a and 7b are mounted on column extending beyond the deck tower 1 and a housing, although not shown.

A description will now be made with reference to FIGS. 4 to 6 of a method in which one deck is alternatively drawn while the remaining decks are prevented from being drawn.

Figure 4:
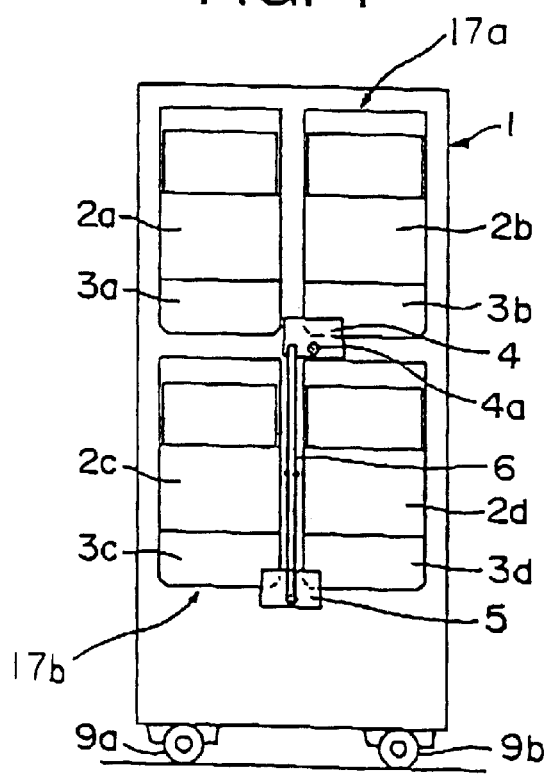
FIG. 4 is a front view showing the deck tower in accordance with the first embodiment of the present invention in the case where the upper left deck tray is permissible to be drawn.
Figure 5:
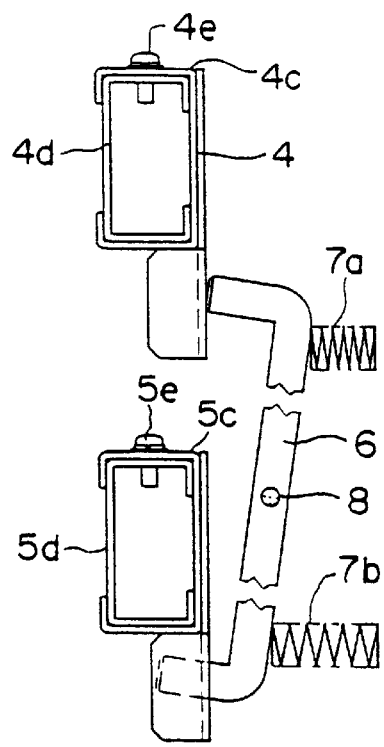
FIG. 5 is a side view showing a link mechanism between the stopper members and the locking arm in accordance with the first embodiment of the present invention, which corresponds to that in FIG. 4.
Figure 6:
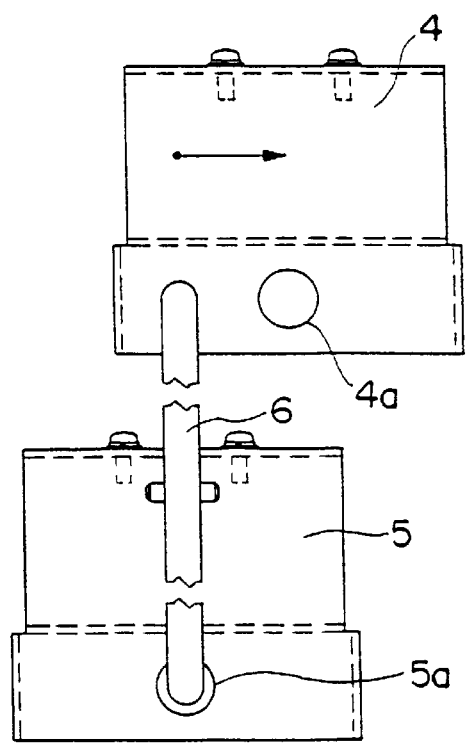
FIG. 6 is an explanatory diagram showing an positional relation of the stopper members in accordance with the first embodiment of the present invention, which corresponds to that in FIG. 4.

When a maintenance work is performed on the upper left deck 2a, an operator first draws the upper portion of the locking arm 6 forward (in the forward direction as viewed in FIG. 4; and to the right in FIG. 5). This causes one end of the locking arm 6 to be pulled up from the stopper hole 4a of the stopper member 4 so that the stopper state in the stopper member 4 may be released and slidingly movable in the horizontal direction.

Since the stopper member 4 is moved to the right in FIG. 4, the locked state of the upper left deck tray 3a is released, and can be drawn forward in FIG. 4. Therefore, a maintenance work on the deck 2a can be performed.

Now, the stopper member 4 is moved to the right, which serves as a stopper, thereby maintaining the locked state of the deck tray 2b to prevent the tray from being drawn.

The stopper means 5 at the lower tier is prevented from horizontally moving since the lower end of the locking arm 6 is plunged into the lock hole 5a, and is positioned between the deck trays 3c and 3d at the lower tier, which also serves as a stopper so that neither the deck tray 3c nor 3d may be drawn. Under this condition, if an operator inadvertently pulls up the lower end of the locking arm 6 forward to draw any of the deck trays 3c and 3d at the lower tier, the upper end of the locking arm 6 is in contact with the proximal front surface of the stopper member 4 at the upper tier so that the locking arm 6 may not be rocked. Therefore, since the stopper member 5 at the lower tier is completely prevented from moving, neither the deck tray 3c nor 3d at the lower tier can be drawn out of the deck tower.

Figure 11:
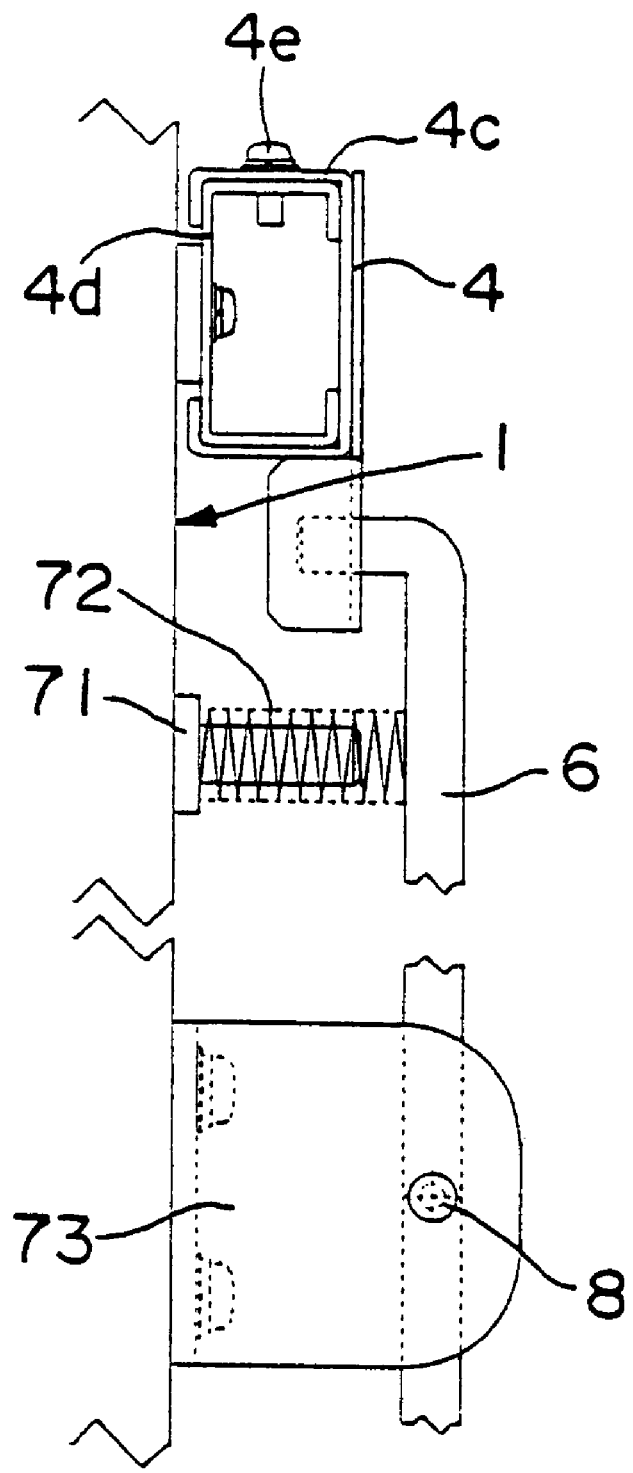
FIG. 11 is a first side view showing a modification in accordance with the first embodiment of the present invention.
Figure 12:
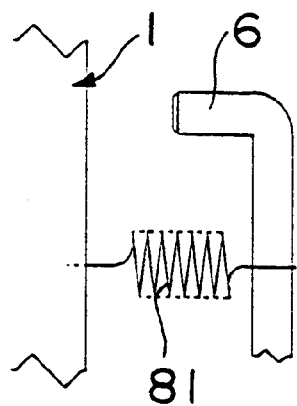
FIG. 12 is a second side view showing a modification in accordance with the first embodiment of the present invention.
Figure 13:
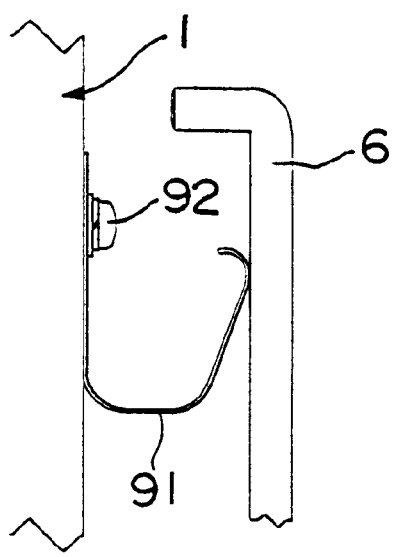
FIG. 13 is a third side view showing a modification in accordance with the first embodiment of the present invention.

FIGS. 11, 12 and 13 show modifications of the first embodiment of the present invention. Referring to FIG. 11, a pivot portion 8 is mounted on a guide 73 extending from the deck tower 1, and the locking arm 6 can be rocked about the pivot portion 8. Further, the locking arm 6 is biased in the direction opposite to the deck tower by a spring 72 engaged with a projecting member 71 attached to the deck tower 1. If the upper end of the locking arm 6 is pressed against the spring 72 toward the deck tower 1, the distal end of the projecting member 71 serves as a stopper so that the upper end of the locking arm 6 can be prevented from pushing with more than a predetermined force. Although not shown in FIG. 11, a spring and a projecting member for biasing the locking arm 6 are also provided beneath via the pivot portion 8, and the locking arm 6 is kept into a neutral position (where the upper and lower stopper members 4 and 5 are locked) in a normal state (where all the decks are locked).

While a compression spring is used as the spring 72 in the previous description, an expansion spring 81 as shown in FIG. 12 may also be used to pull the locking arm 6 at the upper and lower positions toward the deck tower 1 to maintain a neutral position. Other than a spring, as shown in FIG. 13, a flat spring 91 that has been compressed into a U-shape may also be used, one end of which is fixed to the deck tower 1 by a screw 92 while the other end is repelled in the direction opposite to the deck tower.

Second Embodiment

The present embodiment is characterized in that cams 14 and 15 are cooperated with the stopper members 4 and 5. The present embodiment will now be described using a cam 14 at the upper tier by way of example. The cam 14 is shaped into a disc to be rotatable about a rotational axis 14a extending from the deck tower side, and an engagement pin 14b is projected from a portion of the disc surface in position at the deck tower side. The engagement pin 14b is engaged with an elliptical engagement hole 14f in the stopper member 4. With such an engaging structure, the cam 14 is rotated clockwise when the stopper member 4 is moved to the right, and rotated counterclockwise when the stopper member 4 is moved to the left.

A cam 15 at the lower tier has substantially the same mechanism as that of the cam 14 at the upper tier. The upper cam 14 and the lower cam 15 are interlocked with each other by a link arm 16. The upper end of the link arm 16 is engaged in position opposite to the engagement pin 14b about the rotational axis 14a. On the other hand, the lower end of the link arm 16 is engaged in position of the engagement pin 15b.

This relation between the cams 14 and 15 and the link arm enables the following operation.

In order to draw the upper left deck tray 3a, an operator moves the stopper member 4 to the right. Then, the locked state of the upper left deck tray 3a is released. At this time, as the stopper member 4 moves to the right, the cam 14 is rotated clockwise, and the upper end of the link arm 16 is pulled in the upper left direction from a lower position of the cam 14.

Figure 7:
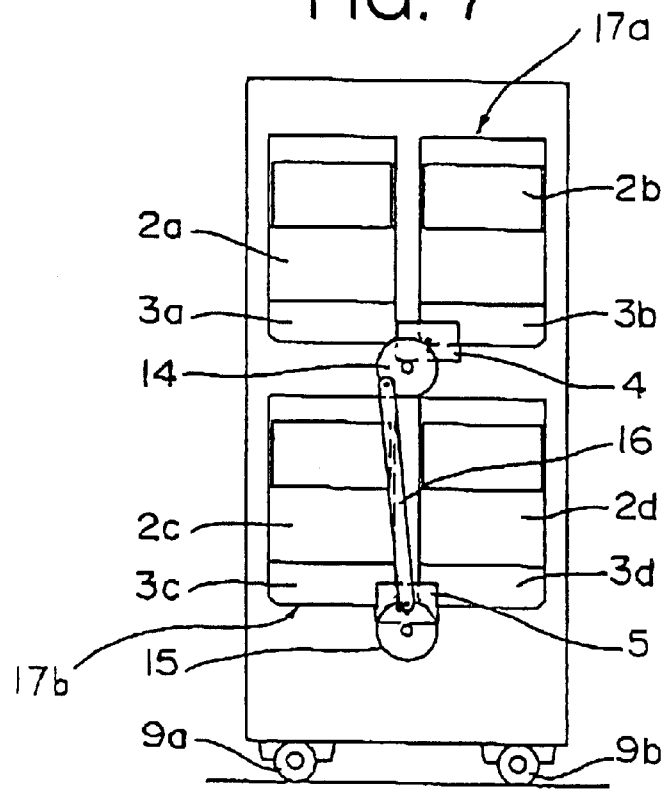
FIG. 7 is a front view showing a deck tower in accordance with a second embodiment of the present invention.
Figure 8:
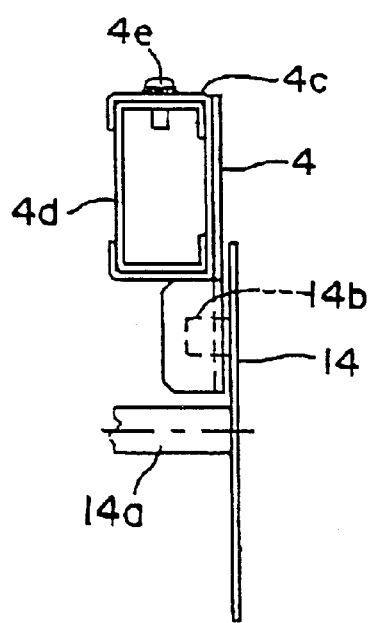
FIG. 8 is a side view showing a link mechanism between stopper members and a cam in accordance with a second embodiment of the present invention.
Figure 10:
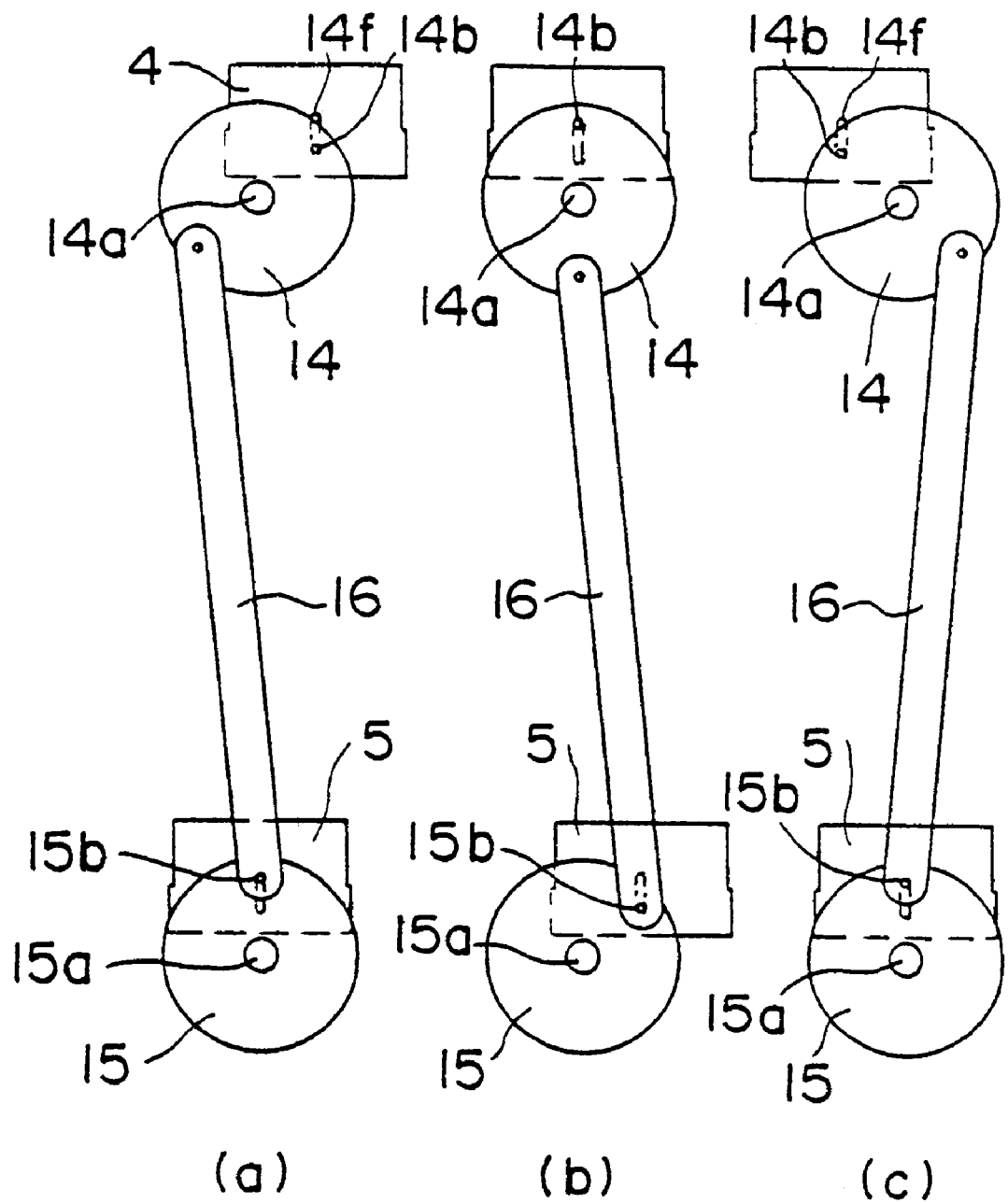
FIGS. 10A, 10B, and 10C are explanatory diagrams showing a positional relation between the stopper members and the cams and the link arms in accordance with the second embodiment of the present invention.

With this pulling operation of the link arm 16, the cam 15 is rotated so that the lower end of the link arm 16 may be positioned where the engagement pin 15b of the lower cam 15 is positioned uppermost. This state is shown in FIG. 7 or FIG. 10A. The cam 15 is stopped at this position, thereby preventing the stopper member 5 from moving, so that the lower row decks 3c and 3d may not be drawn.

Figure 9:
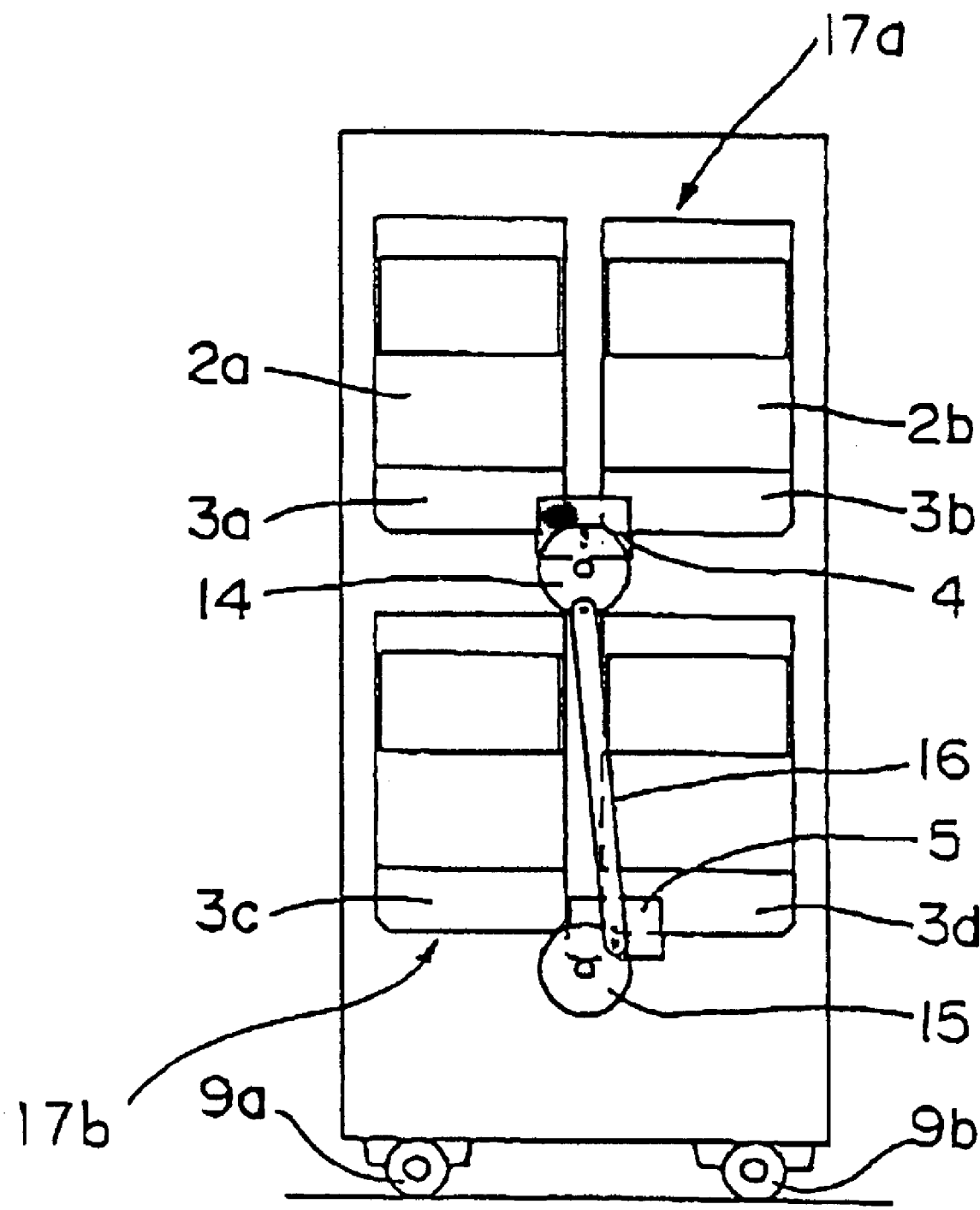
FIG. 9 is a front view showing the deck tower in accordance with the second embodiment of the present invention in the case where the upper left deck tray is permissible to be drawn.

FIGS. 9 and 10B show a positional relation between the link arm 16, the stopper members 4 and 5, and the cams 14 and 15 in the case where the lower left deck tray 3c can be drawn. In this positional relation, the lower row stopper member 5 is moved to the right, in association with which the cam 15 is rotated clockwise and the engagement pin 15b is also moved to the right-handed lateral direction from the uppermost of the cam 15. Therefore, the link arm 16 is pulled downward, and the upper end of the link arm 16 stops the upper row cam 14 in a neutral position. Accordingly, the stopper member 4 at the upper tier is also stopped between the upper trays 3a and 3b so that the upper trays 3a and 3b cannot be drawn.

FIG. 10C shows a positional relation between the link arm 16, the stopper members 4 and 5, and the cams 14 and 15 in the case where the upper right deck tray 3b is drawn.

As described above, according to the second embodiment of the present invention, a disc-type cam mechanism having less projection from the deck tower 1 allows an operational linkage between the stopper member 4 at the upper tier and the stopper member 5 at the lower tier to be embodied, without the pivot portion 8, the locking arm 6, the springs 7a and 7b, etc., which are projected outwardly from the deck tower 1 according to the first embodiment.

What is claimed is:

1. A deck apparatus in a deck tower having shelves which are located at upper and lower tiers, each tier receiving two decks in parallel, the deck tower from which decks accommodated in the deck shelves are drawable, said deck apparatus comprising:

a stopper member movably provided one at each deck shelf for being positioned such that when one deck at one tier is permissible to be drawn, the remaining decks are prevented from being drawn; and a locking arm movably provided between a state of preventing one of the stopper members from moving and a state of non-prevention, when said stopper member at any shelf is moved to release the prevention of drawing the decks, which is the state of preventing by said stopper member.

2. A deck apparatus as claimed in claim 1, wherein a movement preventing hole is formed in said stopper member, said locking arm being capable of being rocked about a pivot portion positioned between the deck shelves at the upper and lower tiers, the both ends of said locking arm being rocked to be plunged into the movement preventing hole in one of the upper and lower stopper members to prevent the one stopper member from moving so that only the other stopper member may be permitted to move.

3. A deck apparatus in a deck tower having deck shelves in at least upper and lower tiers, the deck tower from which decks accommodated in the deck shelves are drawable, said deck apparatus comprising:

a stopper member slidably provided at each shelf for preventing the decks from being drawn;

cams cooperated with the sliding movement of said stopper member to rotate; and a link arm provided to link said cams for operating said cams at the upper and lower tiers to be interlocked with each other so that when said stopper member at one of the upper and lower tiers is moved in the direction where the deck is permissible to be drawn, the other stopper member is positioned in place to prevent the decks from being drawn.

4. A deck apparatus in a deck tower having deck shelves in at least upper and lower tiers, the deck tower from which decks accommodated in the deck shelves are drawable, said deck apparatus comprising:

a stopper member slidably provided at each shelf for preventing the decks from being drawn;

cams cooperated with the sliding movement of said stopper member to rotate; and a link arm for operating said cams at the upper and lower tiers to be interlocked with each other so that when said stopper member at one of the upper and lower tiers is moved in the direction where the deck is permissible to be drawn, the other stopper member is positioned in place to prevent the decks from being drawn.

* * * * *